(12) United States Patent
Diaz

(10) Patent No.: US 7,055,255 B2
(45) Date of Patent: Jun. 6, 2006

(54) INCLINATION ANGLE READER AND METHOD FOR USING SAME

(75) Inventor: Hiram Diaz, 2725 SW. 78th Ave., Miami, FL (US) 33155

(73) Assignee: Hiram Diaz, Miami, FL (US)

( * ) Notice: Subject to any disclaimer, the term of this patent is extended or adjusted under 35 U.S.C. 154(b) by 0 days.

(21) Appl. No.: 10/955,105

(22) Filed: Sep. 30, 2004

(65) Prior Publication Data

US 2005/0091862 A1 May 5, 2005

Related U.S. Application Data

(60) Provisional application No. 60/515,806, filed on Oct. 29, 2003.

(51) Int. Cl.
*G01C 9/06* (2006.01)
*G01C 9/12* (2006.01)

(52) U.S. Cl. ............................. 33/366.24; 33/366.26; 33/1 PT

(58) Field of Classification Search ................. 33/1 N, 33/1 PT, 366.11, 366.24, 366.26, 391; 338/49, 338/196
See application file for complete search history.

(56) References Cited

U.S. PATENT DOCUMENTS

| | | | |
|---|---|---|---|
| 2,497,607 A * | 2/1950 | Herr | 33/366.24 |
| 2,621,275 A * | 12/1952 | Nielsen et al. | 33/1 PT |
| 2,647,323 A * | 8/1953 | Johnson et al. | 33/366.24 |
| 3,113,283 A * | 12/1963 | Fliegler et al. | 338/46 |
| 3,791,042 A * | 2/1974 | Bell | 33/366.24 |
| 5,127,167 A | 7/1992 | Kennedy | |
| 5,170,567 A | 12/1992 | Davis et al. | |
| 5,479,716 A | 1/1996 | Murphy | |
| 5,509,210 A | 4/1996 | Murphy | |
| 5,612,679 A | 3/1997 | Burgess | |
| 5,630,280 A | 5/1997 | Crossan, Jr. | |
| 5,642,869 A | 7/1997 | Miller | |
| 5,673,491 A * | 10/1997 | Brenna et al. | 33/366.24 |
| 5,680,708 A | 10/1997 | James | |
| D385,807 S | 11/1997 | Gruetzmacher | |
| 5,731,761 A | 3/1998 | Sychra | |
| 5,774,996 A | 7/1998 | Ogawa et al. | |
| 5,802,728 A | 9/1998 | Karnick et al. | |
| 5,841,353 A | 11/1998 | Chisholm et al. | |
| 5,852,878 A | 12/1998 | Seipp, Jr. et al. | |
| 5,900,810 A | 5/1999 | Park et al. | |
| 5,907,278 A | 5/1999 | Park et al. | |
| 5,926,965 A | 7/1999 | Shijo et al. | |
| 5,929,754 A | 7/1999 | Park et al. | |
| 5,936,161 A | 8/1999 | Fischer | |
| 5,955,713 A | 9/1999 | Titus et al. | |
| 5,992,032 A | 11/1999 | Chiang et al. | |
| 6,073,355 A | 6/2000 | Chiang et al. | |

(Continued)

*Primary Examiner*—G. Bradley Bennett
(74) *Attorney, Agent, or Firm*—Lott & Friedland, P.A.

(57) ABSTRACT

A system and method for measuring the angle of inclination of a surface or object with respect to the gravitational horizontal, having (1) an electric circuit with a homogeneous resistance curved to form a circumference, (2) a device or voltmeter to measure the voltage consumed by the resistance in its total length ($V_T$), (3) another device or voltmeter to measure the voltage consumed by a portion of the resistance ($V_P$) which length measured depends on one leg of the device/voltmeter fixed to one end of the resistance and the other leg of the device/voltmeter, with a weight and constant contact with resistance, moving due to the gravitational force as the circumference rotates on a horizontal axis, (4) a device that takes the voltages measured and outputs the inclination given by this formula [($V_P$:$V_T$) *Scale].

10 Claims, 5 Drawing Sheets

U.S. PATENT DOCUMENTS

| | | |
|---|---|---|
| 6,137,065 A | 10/2000 | Zefira |
| 6,247,239 B1 | 6/2001 | Shijo et al. |
| 6,249,984 B1 | 6/2001 | Barsky et al. |
| 6,290,188 B1 | 9/2001 | Bassett |
| 6,301,795 B1 | 10/2001 | Kang |
| 6,343,422 B1 | 2/2002 | Takahashi |
| 6,370,784 B1 | 4/2002 | Hunter et al. |
| 6,400,159 B1 | 6/2002 | Zeller et al. |
| 6,427,348 B1 | 8/2002 | Webb |
| 6,449,857 B1 | 9/2002 | Anikolenko |
| 6,453,571 B1 | 9/2002 | Crossan, Jr. |
| 6,490,802 B1 | 12/2002 | Schutt |
| D470,823 S | 2/2003 | Ufer |
| 6,523,409 B1 | 2/2003 | Brudis et al. |
| 6,526,668 B1 | 3/2003 | Beckhart et al. |
| D474,159 S | 5/2003 | Ufer |
| 6,571,483 B1 * | 6/2003 | Mangerson ............... 33/366.26 |
| 6,594,912 B1 * | 7/2003 | Ashjaee ....................... 33/391 |

\* cited by examiner

INCLINATION ANGLE READER AND METHOD FOR USING SAME

CLAIM OF PRIORITY

This is a non-provisional application based on U.S. Application Ser. No. 60/515,806, filed on Oct. 29, 2003, the contents of which are incorporated herein by reference.

FIELD OF INVENTION

This invention relates to an inclination sensor and, more particularly, to an electronic inclination sensor that provides for accurate inclination angle readings relative to the gravitational horizontal based on the voltage consumed by an electrical circular homogeneous resistance.

BACKGROUND OF THE INVENTION

Previous attempts have been made to provide an inclination sensor, or the like, such as described in U.S. Pat. No. D474,159 to Ufer ("the '159 patent"); U.S. Pat. No. 6,526,668 to Beckhart et al. ("the '668 patent"); U.S. Pat. No. 6,523,409 to Brudis et al. ("the '409 patent"); U.S. Pat. No. D470,823 S to Ufer ("the '823 patent"); U.S. Pat. No. 6,490,802 to Schutt ("the '802 patent"); U.S. Pat. No. 6,453,571 to Crossan, Jr. ("the '571 patent"); U.S. Pat. No. 6,449,857 to Anikolenko ("the '857 patent"); U.S. Pat. No. 6,427,348 to Webb ("the '348 patent"); U.S. Pat. No. 6,400,159 to Zeller et al. ("the '159 patent"); U.S. Pat. No. 6,370,784 to Hunter et al. ("the '784 patent"); U.S. Pat. No. 6,343,422 to Takahashi ("the '422 patent"); U.S. Pat. No. 6,301,795 to Kang ("the '795 patent"); U.S. Pat. No. 6,290,188 to Bassett ("the '188 patent"); U.S. Pat. No. 6,249,984 to Barsky et al. ("the '984 patent"); U.S. Pat. No. 6,247,239 to Shijo et al. ("the '239 patent"); U.S. Pat. No. 6,137,065 to Zefira ("the '065 patent"); U.S. Pat. No. 6,073,355 to Chiang et al. ("the '355 patent"); U.S. Pat. No. 5,992,032 to Chiang et al. ("the '032 patent"); U.S. Pat. No. 5,955,713 to Titus et al. ("the '713 patent"); U.S. Pat. No. 5,936,161 to Fischer ("the '161 patent"); U.S. Pat. No. 5,929,754 to Park et al. ("the '754 patent"); U.S. Pat. No. 5,926,965 to Shijo et al. ("the '965 patent"); U.S. Pat. No. 5,907,278 to Park et al. ("the '278 patent"); U.S. Pat. No. 5,900,810 to Park et al. ("the '810 patent"); U.S. Pat. No. 5,852,878 to Seipp, Jr. et al. ("the '878 patent"); U.S. Pat. No. 5,841,353 to Chisholm et al. ("the '353 patent"); U.S. Pat. No. 5,802,728 to Karnick et al. ("the '728 patent"); U.S. Pat. No. 5,774,996 to Ogawa et al. ("the '996 patent"); U.S. Pat. No. 5,731,761 to Sychra ("the '761 patent"); U.S. Pat. No. D385,807 to Gruetzmacher ("the '807 patent"); U.S. Pat. No. 5,680,708 to James ("the '708 patent"); U.S. Pat. No. 5,642,869 to Miller ("the '869 patent"); U.S. Pat. No. 5,630,280 to Crossan Jr. ("the '280 patent"); U.S. Pat. No. 5,509,210 to Murphy ("the '210 patent"); U.S. Pat. No. 5,612,679 to Burgess ("the '679 patent"); U.S. Pat. No. 5,479,716 to Murphy("the '716 patent"); U.S. Pat. No. 5,170,567 to Davis et al. ("the '567 patent"); U.S. Pat. No. 5,127,167 to Kennedy ("the '167 patent"); all of which are incorporated herein by reference.

SUMMARY OF THE INVENTION

The subject invention provides an accurate method to determine the angle of inclination in a set scale, which could be degrees, radians, etc., of an object or surface relative to a gravitational horizontal.

This present invention achieves this objective by having a homogeneous resistance bended to form a circumference that rotates on a horizontal axis with the two ends joined at its closest point to the earth as the initial position (inclination zero), and by getting the relation between the total voltage consumed by such resistance and the voltage consumed by part of the same resistance measured from one of its fixed ends to its closest point to the earth as it rotates on a horizontal axis. Such relation dictates what portion of the circumference is covered by a virtual arc formed from the center of the circumference to the fixed ends join of the resistance, which moves with the circumference as it rotates, and to the circumference's closest point to the earth. The angle of such arc is the angle of the surface measured with respect to the gravitational horizontal.

DETAILED DESCRIPTION OF THE PREFERRED EMBODIMENT

For the purposes of this application $V_P$ means "partial voltage" or, the voltage consumed by part of the resistance from one end to the moving weight, and $V_T$ means "total voltage" or, the voltage consumed by the entire resistance from one end to the other. Scale is the value and unit of the angle whose arc makes a closed circumference, which will dictate the unit of the angle of inclination measured. For instance, if Scale=360° the measurement will be given in degrees or if Scale=$2\pi$ the measurement will be given in radians.

Figure 1:
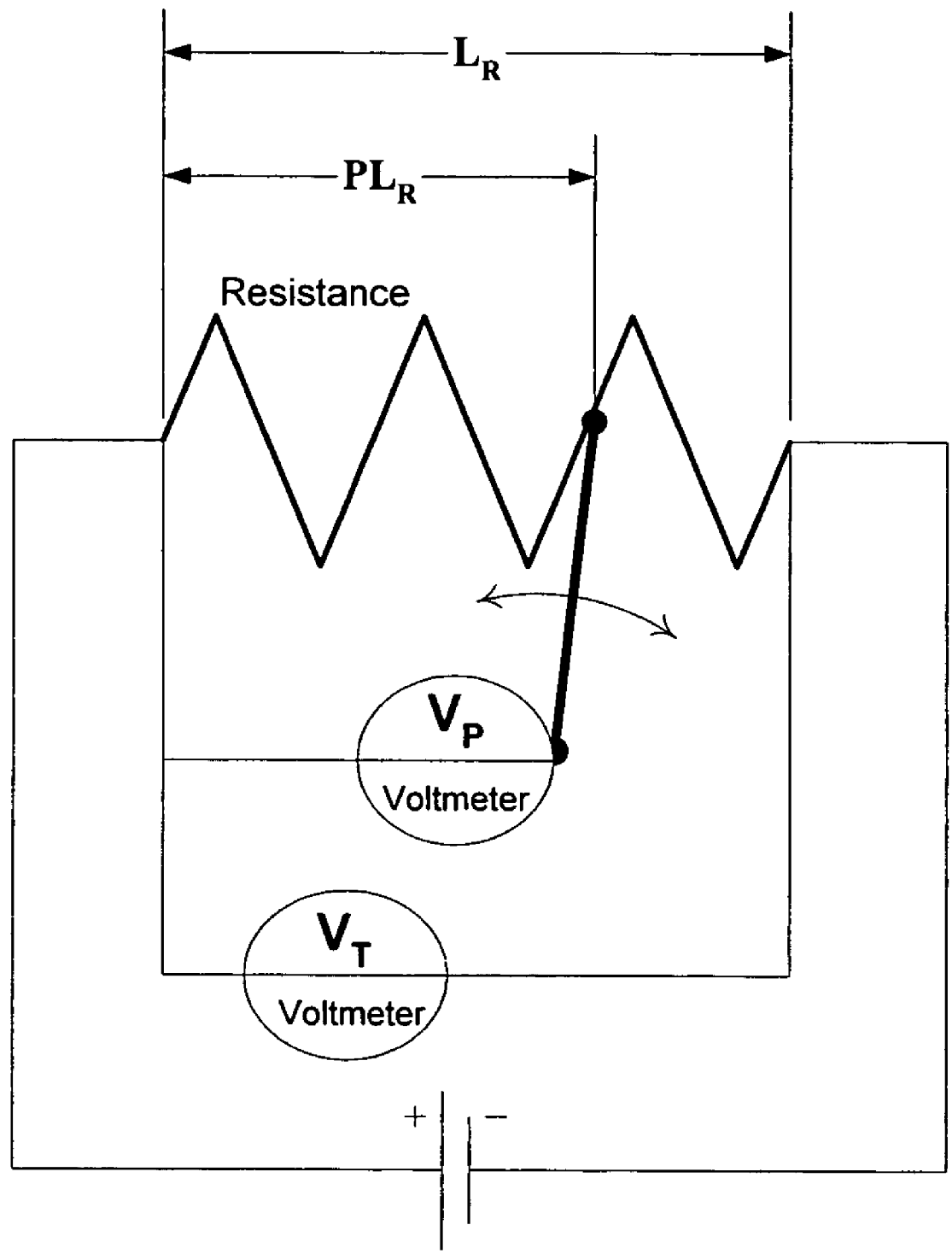
FIG. 1 illustrates the elements of the electric circuit used in this invention.

Reference is now made to FIG. 1 which shows the electronic circuit to help explain part of the theory of the invention. The circuit is fed by an DC electrical current, it has a homogeneous resistance or something that functions like it, hereinafter referred to as the Resistance; one voltmeter that measures the voltage consumed by the total length of the Resistance ($L_R$), so that the reading of such voltmeter, $V_T$, is the maximum voltage consumed by the Resistance; a second voltmeter that measures the voltage consumed by a portion of the Resistance ($PL_R$) by having one leg of the voltmeter fixed to one end of the Resistance and the other leg moved from one end of the Resistance to the other, so that the reading of such voltmeter, $V_P$, is the voltage consumed by the portion of the Resistance with length $PL_R$. For further use in the summary of the invention it is proven below that the relation between LR and PLR is the same as the relation between $V_T$ and $V_P$, and that with the voltage readings of $V_T$ and $V_P$ the portion of the Resistance being measured by the voltmeter reading $V_P$ can be calculated.

Proof of the relation between length of resistance and voltage consumed: Since the Resistance is homogeneous the voltage consumed by a segment of the resistance depends only on some constants, which for the purpose of the proof will be called K, and the length of such segment. We then have that $V_T=K*L_R$ and $V_P=K*PL_R$; therefore, $V_T/V_P=L_R/PL_R$.

Proof that with the voltage readings ($V_T$ and $V_P$) of the two voltmeter shown in FIG. 1, the portion of $L_R$ covered by $PL_R$ can be calculated: Since $PL_R$ is a portion of $L_R$, also indicated as $0<=PL_R<=L_R$, then $L_R/PL_R$ is a fraction whose possible values are between 0 and 1, hereinafter referred as P, that indicates what portion of the total length of the resistance $PL_R$ is. Notice that P*100% yields what percentage of $L_R$, $PL_R$ is. Since $V_T/V_P=L_R/PL_R$ and $L_R/PL_R=P$, then $V_T/V_P=P$, which as mentioned before, it indicates what portion or percent of the resistance gives the $V_P$ reading. Furthermore, since the voltmeter that gives the reading of $V_P$ has one leg fixed to one end of the resistance, P indicates the portion of the Resistance from that end to the moving leg of the voltmeter reading $V_P$.

Figure 2:
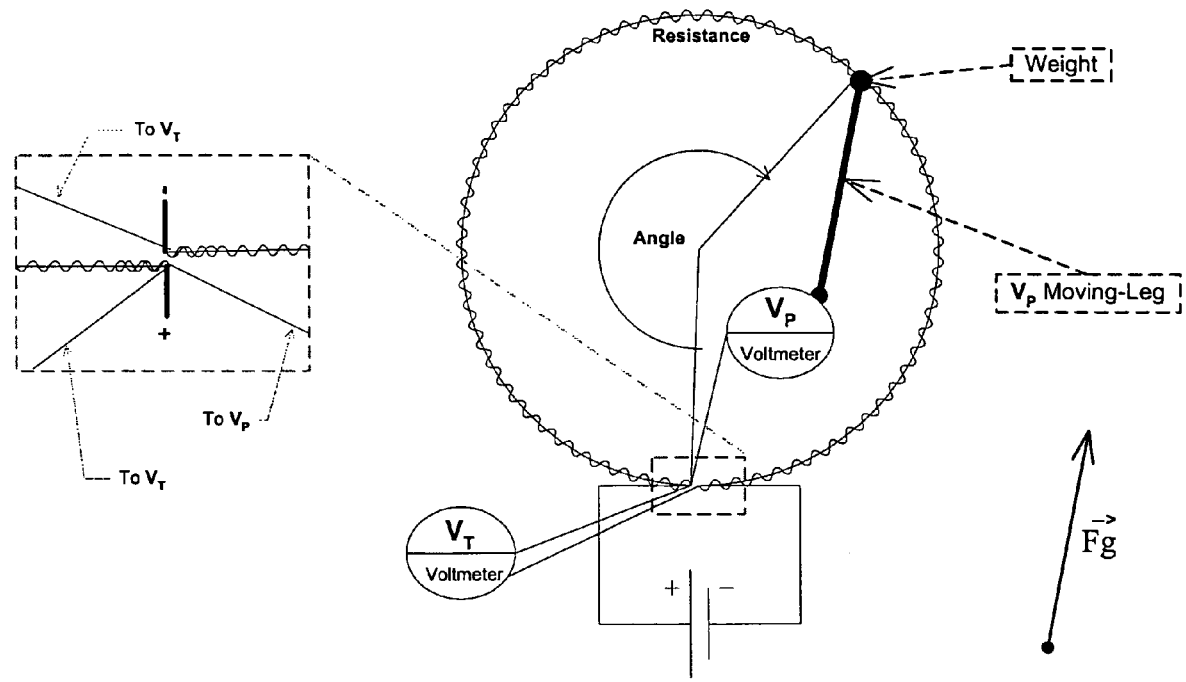
FIG. 2 illustrates the same circuit as FIG. 1 but with the actual shape of its elements and the existences of a weight at the end of the voltmeter moving leg that moves due to gravity with constant contact with the resistance as it rotates on a horizontal axis.

Reference is now made to FIG. 2 which shows the same circuit as in FIG. 1, but with the Resistance forming a circumference. The Resistance is curved to form a circumference, where the two ends of the Resistance do not touch but overlap (or the last end is bent to avoid contact with the resistance first end and with the voltmeter moving leg) just enough so that the voltage reading $V_P$ of the voltmeter moving leg can read up to but excluding the maximum voltage consumed by the resistance $V_T$, which means that the moving leg of the voltmeter reading $V_P$ will reach its fix leg [initial end] right before touching the other end of the Resistance. In other words, the two ends of the Resistance must be put in a way so that the voltmeter reading $V_P$ will read zero (0) when its moving leg gets to the other end of the Resistance, just before $V_P$ reads the maximum voltage consumed $V_T$. Consequently, $V_P$ will never be the same as $V_T$ no matter how close the moving leg gets to the other end of the Resistance having $0<=V_P<V_T$. The moving leg of the voltmeter reading $V_P$ has a weight that is moved freely by the gravitational force as the circumference is rotated on a horizontal axis and is in constant contact with the Resistance. It is important to notice that in this drawing the direction of the gravitational force is not downward, in other words the system is rotated. In this setting, P will not only dictate what portion of the Resistance gives the $V_P$ voltage reading, but also what portion of the circumference's perimeter is being measured by such voltmeter. Therefore, the arc that covers such portion of the perimeter from the center of the circumference is a portion P of the arc that covers the entire perimeter of the circumference from its center. If using degrees as units, and knowing that an arc that makes a circumference has a 360° angle, the angle made by the arc that covers the portion of the perimeter of the circumference from its center (length of resistance measured by the voltmeter reading $V_P$) is P*360°. Therefore, by having the two voltage readings ($V_T$ and $V_P$), the angle of the arc that is formed from the center of the circumference to cover the length of the resistance measured by the voltmeter with the moving leg can be calculated knowing the value and unit of the angle whose arc makes a closed circumference. Summarizing the previous analysis into one equation we have Angle=$(V_T/V_P)$*Scale, where Scale is the value and unit of the angle whose arc makes a closed circumference, and Angle is the angle in the Scale's units of the arc formed from the center of the circumference that contains the portion of the circumference/Resistance which gives the $V_P$ reading.

The accuracy of the angle measured (Angle) by this method its given by the ability of registering a voltage change or $V_P$ variation with a very slight movement of the voltmeter moving leg, and this can be improved by the following ways: (1) Increasing the resistance of the Resistance by using a more resistant material as the Resistance, (2) Increasing the length of the Resistance, which translate to increasing the diameter of the circumference and also to increasing of resistance of the Resistance, (3) Increasing the accuracy of the voltmeter to smaller units. It is important to notice that when increasing the resistance of the Resistance by any method, the resulting Resistance should never consume the total voltage supplied by only a segment of it.

Figure 3:
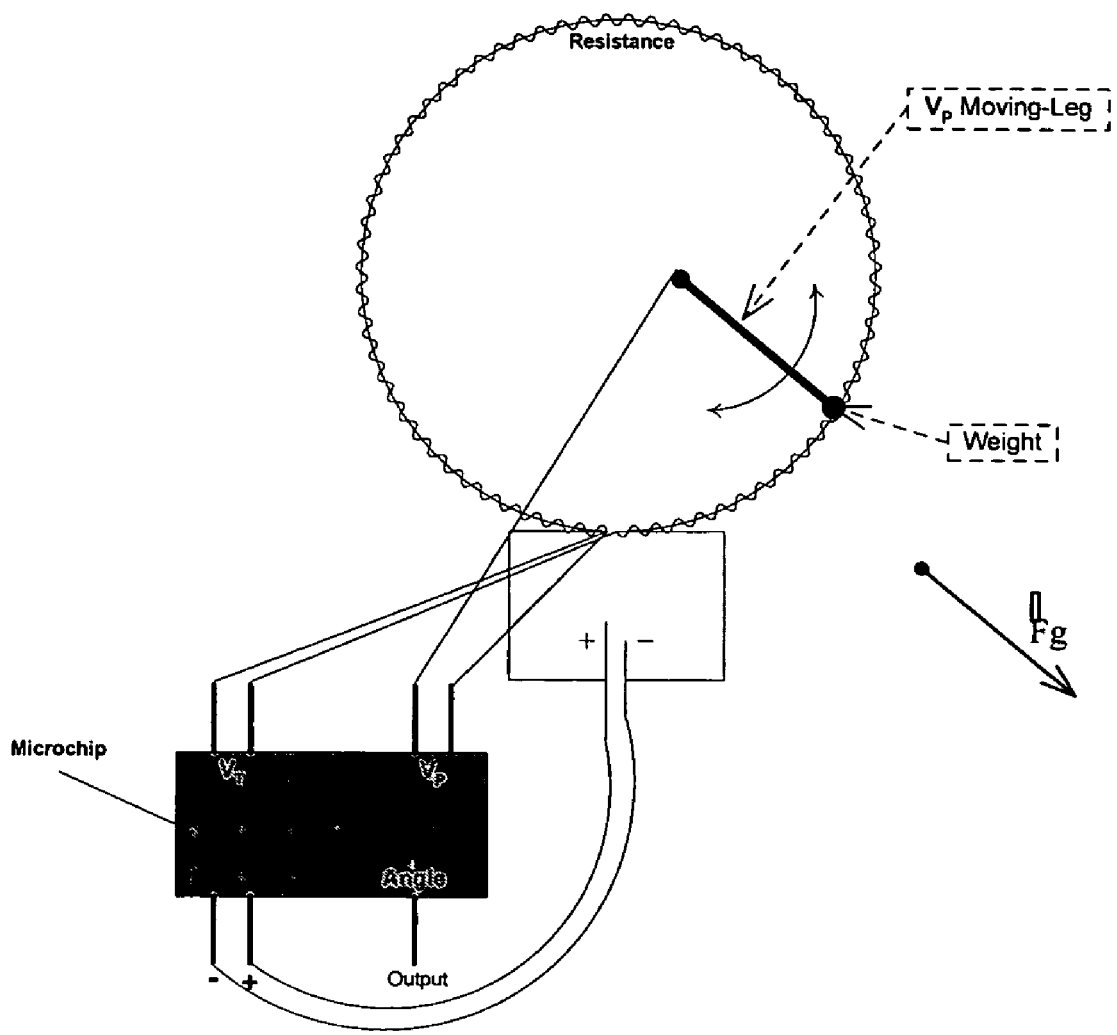
FIG. 3 illustrates how the circuit of FIG. 2 can be made into a device that outputs the angle of inclination.

Reference is now made to FIG. 3 which helps visualize how the method of measuring angle of inclination with respect to the gravitational horizontal, explained above, can be materialized by a very simple configuration. This drawing shows the same circuit as in FIG. 2, but with a microprocessor that would feed from the same power supply as the circuit, get the $V_T$ and $V_P$ reading, and outputs the value of calculating $(V_T/V_P)$*Scale, where the Scale would be a constant valued preprogram in the microprocessor. If the system is configured as in FIG. 3 so that its initial position is where the point of the circumference closest to the source of the gravitational force (the earth) is where the two ends of the Resistance overlap and for which the system's angle is zero (0), the angle measured by the system is the angle formed from moving counter clockwise from the right side the gravitational horizontal as this system moves. For instance, if the Scale preprogrammed in the microchip of this system is 360° and the system is in its initial position (Resistance ends being the closest point of the circumference to the earth) the angle measured by this system would be zero (0), if the system is rotated 90° counter clockwise from the its initial position the angle measured would be 90° and if the system is rotated 90° clockwise from the its initial position the angle measured would be 270°. If this system is encapsulated to form a device that given power would output the value of the angle of inclination base on some indicated reference and scale it could be something like the device shown in FIG. 4.

Figure 4:
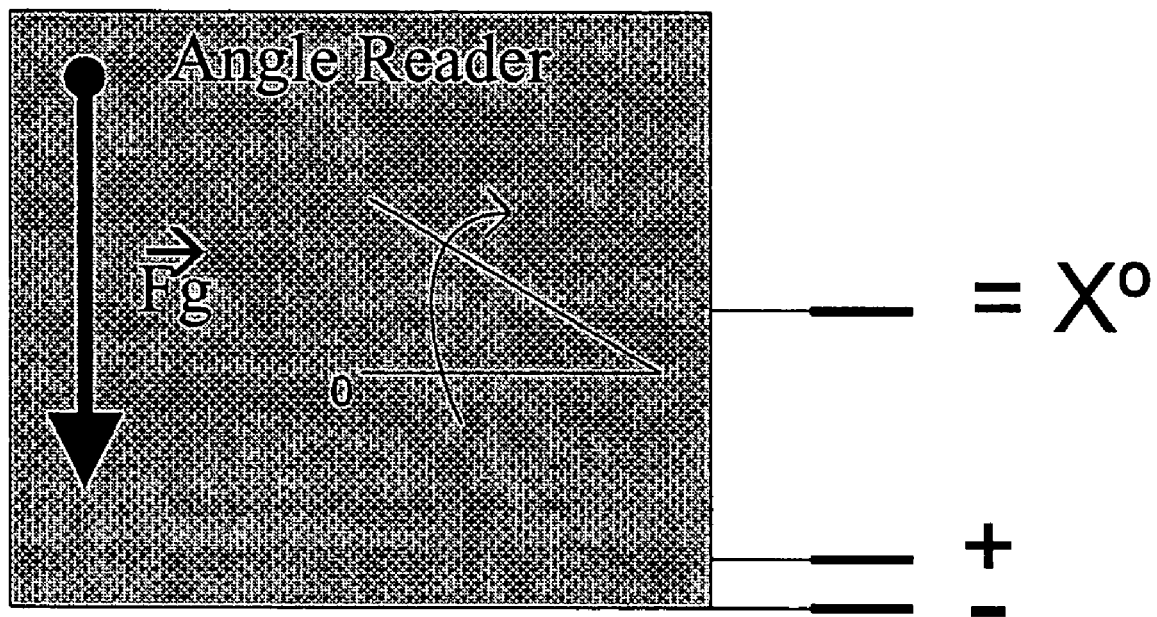
FIG. 4 illustrates a possible use of the invention: A device that given power outputs the angle of inclination with respect to its initial position represented in such device.

Reference is now made to FIG. 4 which shows how a device that implements the method of measuring the angle of inclination with respect to the gravitational horizontal, as described in this invention, may look and be built to be used by any other device. This is only one simple way of using the invention herein described to create a device, which given power and positioned as desired, taking into account the Scale and reference it uses, outputs the angle of inclination which can be used for further computations, displayed in an information screen, etc. This particular device would have, internally, the same elements as shown in FIG. 3 and a Scale=360° with a configuration such that the angle measured and outputted is as shown in the drawing (angled formed from moving clockwise from the left of the gravitational horizontal), where the initial position (Angle=0°) of the device is when the shown gravitational force vector coincides with the actual gravitational force.

Figure 5:
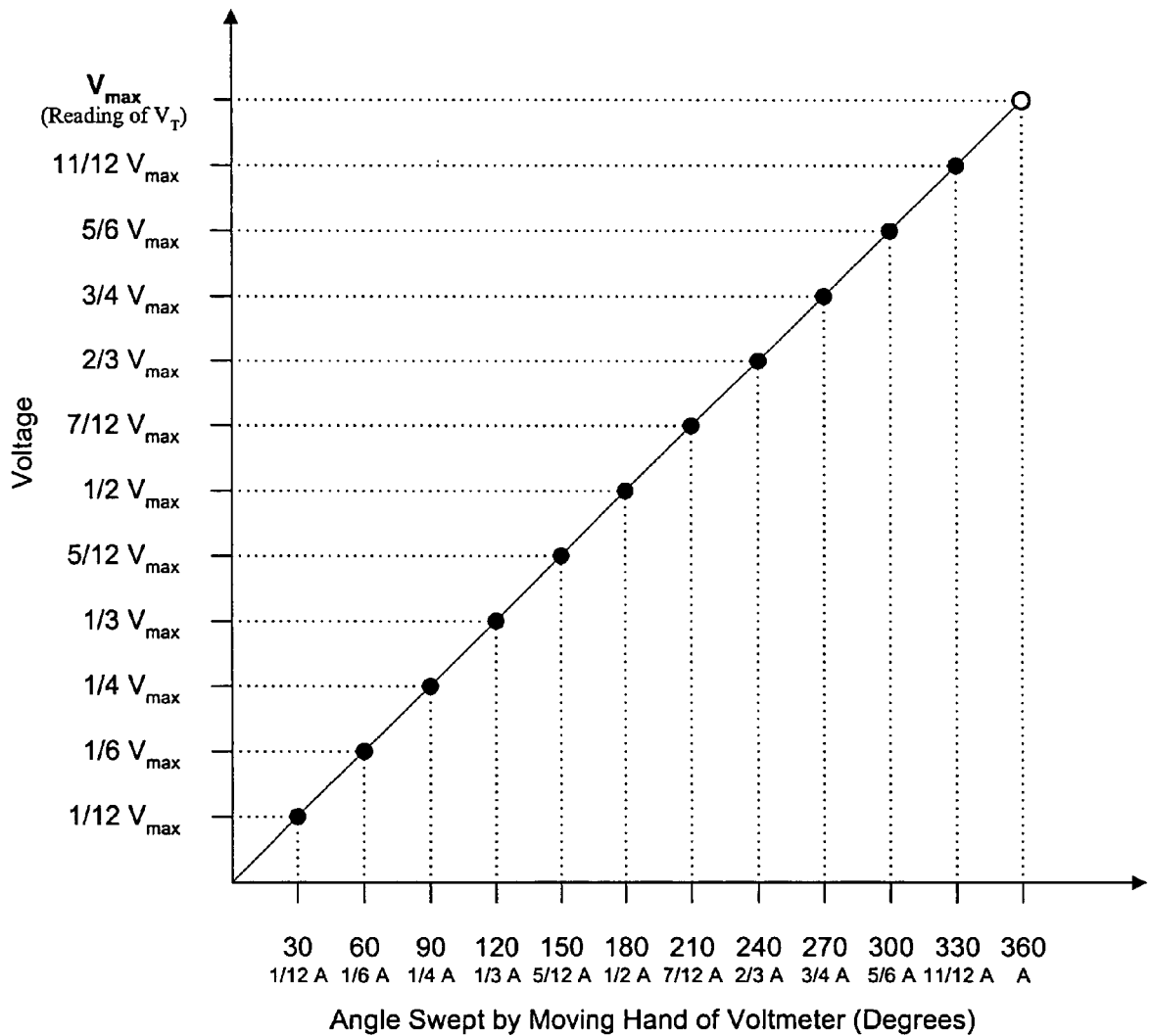
FIG. 5 shows the voltage readings of the voltmeter with the moving leg.

Reference is now made to FIG. 5 which shows how $V_T/V_P=360°$/Angle. This Figure shows the voltage readings of the voltmeter with the moving leg, which has the weight, as such leg moves through the circumference due to gravity and the rotation of the circular resistance on a horizontal axis. Illustrated is how the voltage consumed by part of the resistance is directly proportional to the length of the resistance being measured, and to the angle of the arc created from the center of the circumference and the two points where the moving leg and fix leg of the voltmeter touch the circumference.

To show this relation the variable A was used in the x-axis to be equal to 360°. This graph is self explanatory, what is important to notice is that when $V_P$ is X of $V_T$, the Angle measured is X of 360° (the angle of a circumference arc). It is also important to notice that, as mentioned before, $V_P$ is never equal to $V_T$ ($V_T$ is the non-inclusive limit of $V_P$, where $V_P$=0 when it is reaches its limit $V_T$) and, consequently, the Angle calculated is never 360° (when the Angle is supposed to be 360° it value is 0°).

EXAMPLES OF POSSIBLE INDUSTRIAL APPLICABILITY

As stated above, the present invention pertains to a method of determining the angle of inclination of a surface or object with respect to the gravitational horizontal. The following invention applications are intended for illustrating how the invention can be used but the invention is not limited to such usages. The device shown in FIG. 4, hereinafter referred to as Angle Reader, which implements the invention, will be used in the following examples to demonstrate the usages of this invention.

(1) Digital Level: This invention can be used to build a simple level consisting of an object with at least one flat surface, an Angle Reader aligned with such flat surface, and a screen where the Angle outputted by the Angle Reader can be displayed in digital format. Since the angled read can be displayed in a digital screen, used for other computations, or for computational storage, its value can be saved on command and shown in a different screen as if the digital level has memory of angle readings, resulting in a more useful digital level. Another enhancement of a digital level containing a Angle Reader is to have an screen on the other side of the center of the level where the angle outputted by Angle Reader is displayed showing its complement angle, which is given by this logic If Angle=0° Then Display 0° Else Display 360°−Angle.

(2) Telescope: The Angle Reader can be used in a telescope to obtain the angle of inclination of the telescope with respect to the horizontal plane which can be displayed, saved, used for other computations, etc.

(3) Treadmill: The Angle Reader can be used to determine the inclination of the treadmill platform and display the angle of inclination in a digital format to the user.

(4) Machinery: The Angle Reader can be used in cars, airplanes, and other machinery to read the frontal and lateral angle of inclination which can be displayed to the user or be utilized for other calculations to assure proper operation of the subject machine.

(5) Drills: The Angle Reader can be used in a drill to display to the user the angle of inclination of the direction in which the drill is being operated.

Accordingly, it will be understood that the preferred embodiment of the present invention has been disclosed by way of example and that other modifications and alterations may occur to those skilled in the art without departing from the scope and spirit of the appended claims.

The invention claimed is:

1. An inclination angle reader, comprising:
   a homogenous resistance, wherein said resistance forms a circle or a portion of a circle;
   a power source, whose voltage is known and constant and which supplies enough power to said reader such that said power is not dissipated fully in said resistance;
   a moving leg, wherein said leg has one end movably attached to said homogenous resistance;
   a voltmeter, whereby said voltmeter is connected to said moving leg and measures the voltage from the start point of said resistance to the point where said moving leg is attached to said homogenous resistance; and,
   a processor for calculating an angle, said angle being the angle of the arc formed by the center of said circle to said start point and to the point where said moving leg is attached to said homogenous resistance, based on said known, constant power source voltage and the voltage reading by said voltmeter and the portion of the said circle the said resistance covers.

2. The angle reader of claim 1, wherein said moving leg is positioned by gravity.

3. The angle reader of claim 1, wherein said moving leg is positioned by a non-gravitational force.

4. The angle reader of claim 1, wherein said reader includes a user settable start point.

5. An inclination angle reader, comprising:
   a homogenous resistance, wherein said resistance forms a circle or a portion of a circle;
   a power source, whose voltage is not dissipated fully in the resistance;
   a moving leg, wherein said leg has one end movably attached to said homogenous resistance;
   a power source voltmeter, wherein said power source voltmeter measures the voltage of the power source;
   an intermediate voltmeter, wherein said intermediate voltmeter is connected to said moving leg and measures the voltage from the start point of said resistance to the point where said moving leg is attached to said homogenous resistance; and,
   a processor for calculating an angle, said angle being the angle of the arc formed by the center of said circle to said start point and to the point where said moving leg is attached to said homogenous resistance, based on readings from said power source voltmeter and said intermediate voltmeter and the portion of the said circle the said resistance covers.

6. The angle reader of claim 5, wherein said moving leg is positioned by gravity.

7. The angle reader of claim 5, wherein said moving leg is positioned by a non-gravitational force.

8. The angle reader of claim 5, wherein said reader includes a user settable start point.

9. A method for using an inclination angle reader, comprising the steps of:
   providing a power source operationally connected to a homogenous resistance, wherein said power is not dissipated fully in said resistance and wherein said resistance forms a circle or a portion of a circle;
   positioning said angle reader to measure an angle such that as said reader inclines or declines, a moving leg transits along said homogenous resistance in response to said inclination or declination; and,
   reading the calculated angle displayed on said reader as calculated by a processor utilizing readings from at least one voltmeter.

10. The method of claim 9, further comprising the step of a user setting the start point of at least one voltmeter to aid in said angle calculation.

* * * * *